United States Patent
Ghimire et al.

(10) Patent No.: US 11,381,324 B2
(45) Date of Patent: Jul. 5, 2022

(54) SYSTEM, APPARATUS, AND METHOD FOR REMOTE ANTENNA COMPENSATOR

(71) Applicant: Lear Corporation, Southfield, MI (US)

(72) Inventors: Jagat J. Ghimire, Southfield, MI (US); David R. Mulligan, Livonia, MI (US)

(73) Assignee: LEAR CORPORATION, Southfield, MI (US)

( * ) Notice: Subject to any disclaimer, the term of this patent is extended or adjusted under 35 U.S.C. 154(b) by 108 days.

(21) Appl. No.: 16/860,795

(22) Filed: Apr. 28, 2020

(65) Prior Publication Data

US 2021/0336711 A1    Oct. 28, 2021

(51) Int. Cl.
| | |
|---|---|
| *H04B 17/19* | (2015.01) |
| *H01Q 1/32* | (2006.01) |
| *H04B 17/10* | (2015.01) |
| *H04B 17/29* | (2015.01) |
| *H04B 17/318* | (2015.01) |

(52) U.S. Cl.
CPC .............. *H04B 17/19* (2015.01); *H01Q 1/32* (2013.01); *H04B 17/102* (2015.01); *H04B 17/29* (2015.01); *H04B 17/318* (2015.01)

(58) Field of Classification Search
CPC ...... H04B 17/19; H04B 17/29; H04B 17/318; H04B 17/102; H01Q 1/32
See application file for complete search history.

(56) References Cited

U.S. PATENT DOCUMENTS

| | | | |
|---|---|---|---|
| 9,191,903 B2 | 11/2015 | Sasson | |
| 9,955,371 B1* | 4/2018 | Koebele | ............ H04W 56/0025 |
| 10,038,508 B1* | 7/2018 | Kerselaers | ........... H04B 17/104 |

(Continued)

FOREIGN PATENT DOCUMENTS

| | | |
|---|---|---|
| DE | 102008030113 A1 | 10/2009 |
| EP | 3331316 A1 | 6/2018 |

OTHER PUBLICATIONS

CURT, "CURT Launches First-Ever Mobile, Bluetooth Break Control", https://www.curtmfg.com/news/curt-launches-first-ever-mobile-bluetooth-brake-control viewed on Jul. 19, 2019, Nov. 6, 2018, 3 pgs.

(Continued)

*Primary Examiner* — Steven H Nguyen
(74) *Attorney, Agent, or Firm* — Brooks Kushman P.C.

(57) ABSTRACT

In at least one embodiment, a system for enabling wireless communication for a vehicle is provided. At least one controller to generate first information for the vehicle for transmission to at least one surrounding vehicle or an infrastructure external to the vehicle and to receive second information. The remote active antenna assembly to receive the first information over a cable and wirelessly receive over a wireless communication protocol, a control indicative of the remote active antenna assembly being in one of a transmit mode or a receive mode. The remote active antenna assembly to wirelessly transmit, via a remote active element, the first information in response to the control signal indicating that the remote active assembly is in the transmit mode and to wirelessly receive, via the remote active element, the second information in response to the control signal indicating that the remote active assembly is in the receive mode.

18 Claims, 4 Drawing Sheets

(56) References Cited

U.S. PATENT DOCUMENTS

| | | | |
|---|---|---|---|
| 2013/0005264 A1* | 1/2013 | Sakata | H04W 52/0229 |
| | | | 455/41.2 |
| 2013/0106750 A1* | 5/2013 | Kurosawa | G06F 3/041 |
| | | | 345/173 |
| 2015/0187147 A1* | 7/2015 | Tieman | G07C 5/08 |
| | | | 701/33.2 |
| 2016/0197783 A1* | 7/2016 | Hort | H04L 41/0809 |
| | | | 709/222 |
| 2017/0054204 A1 | 2/2017 | Changalvala et al. | |
| 2018/0152898 A1* | 5/2018 | Gossner | H04W 52/18 |
| 2018/0351641 A1* | 12/2018 | Hoffmann | H04W 24/08 |
| 2019/0200192 A1 | 6/2019 | Winkelmann | |

OTHER PUBLICATIONS

Zbark Store, "Bluetooth OBD2 II Car Auto Scanner Diagnostic Tool YHOBD001", https://www.aliexpress.com/item/32953519630.html?spm=2114.search0302.3.150.55881b viewed on Jul. 19, 2019, 8 pgs.

CURT "Echo: A Wireless Brake Controller for Your Smartphone", https://www.curtmfg.com/dm/echo-mobile-brake-controller?utm_source=google&utm_medium=search&utm_campaign=echo_gsearch_exact&utm _ter%E2%80%A6 viewed on Jun. 12, 2019, 5 pgs.

Office Action dated Mar. 14, 2022 for German Application No. 102021110591.9 filed Apr. 26, 2021, 13 pgs.

\* cited by examiner

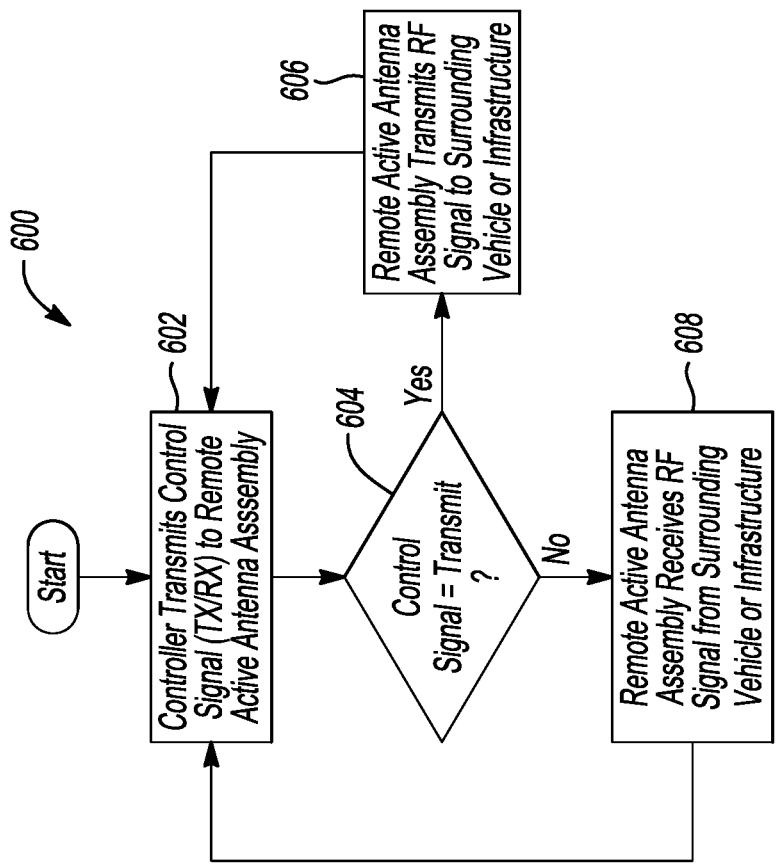
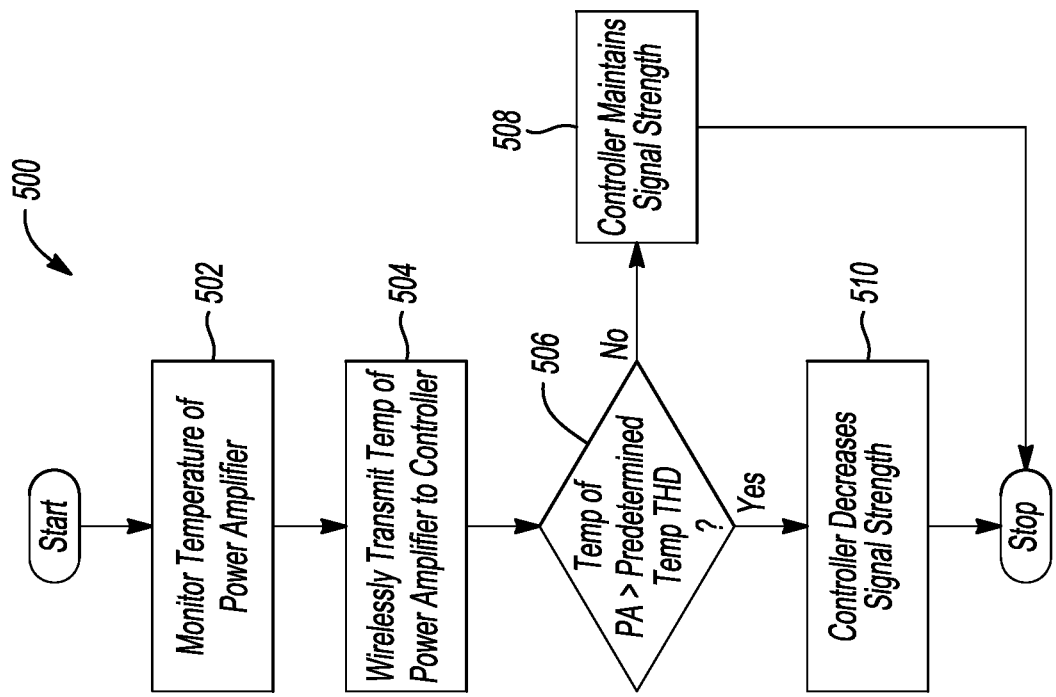

SYSTEM, APPARATUS, AND METHOD FOR REMOTE ANTENNA COMPENSATOR

TECHNICAL FIELD

Aspects disclosed herein may generally relate to a system, apparatus, and method for a remote antenna compensator. In one aspect, the disclosed apparatus and method for the remote antenna compensator may be used for vehicle applications. These aspects and others will be discussed in more detail below.

BACKGROUND

EP3331316A1 to Gossner et al. provides a remote antenna system. The remote antenna system comprises an antenna controller circuit and a remote antenna circuit coupled to the antenna controller circuit by a cable. The remote antenna system further comprises a bidirectional data signal path for carrying transmit and received data signals between the antenna controller circuit and the remote antenna circuit; and a control path for carrying control information between the antenna controller circuit and the remote antenna circuit. The control path is a bidirectional control path. The control path comprises a transmit circuit comprising an input to receive control information and configured to convert the control information into a series of pulses; and a receive circuit comprising a comparator circuit configure to receive the series of pulses and reconstruct them to the control signal.

SUMMARY

In at least one embodiment, a system for enabling wireless communication for a vehicle is provided. The system includes at least one controller and a remote active antenna assembly. The at least one controller is configured to generate first information for the vehicle for transmission to at least one surrounding vehicle or an infrastructure external to the vehicle and to receive second information from the at least one surrounding vehicle or the infrastructure external to the vehicle. The remote active antenna assembly is configured to receive the first information over a cable and to wirelessly receive over a wireless communication protocol a control signal directly from the controller. The control signal is indicative of the remote active antenna assembly being in one of a transmit mode or a receive mode. The remote active antenna assembly is further configured to wirelessly transmit, via a remote active element, the first information to the at least one surrounding vehicle or the infrastructure external to the vehicle in response to the control signal indicating that the remote active assembly is in the transmit mode and to wirelessly receive, via the remote active element, the second information from the at least one surrounding vehicle or the infrastructure external to the vehicle in response to the control signal indicating that the remote active assembly is in the receive mode.

In at least another embodiment, an apparatus for enabling wireless communication for a vehicle is provided. The system includes a wireless protocol controller and a remote active antenna assembly. The remote active antenna assembly includes the wireless protocol controller. The remote active antenna assembly is configured to receive first information for the vehicle for transmission to at least one surrounding vehicle or an infrastructure external to the vehicle over a cable from at least one controller and to wirelessly transmit the first information to the at least one surrounding vehicle or the infrastructure. The remote active antenna assembly is further configured to wirelessly receive second information from the at least one surrounding vehicle or the infrastructure external to the vehicle and to transmit the second information to the at least one controller. The remote active antenna assembly is further configured to perform diagnostics on the remote antenna element and to wirelessly transmit third information corresponding to the diagnostics of the remote antenna element to the at least one controller to provide operational status of the cable.

In at least another embodiment, a computer-program product embodied in a non-transitory computer readable medium that is programmed to enable wireless communication for a vehicle is provided. The computer-program product includes instructions to receive first information for the vehicle for transmission to at least one surrounding vehicle or an infrastructure external to the vehicle over a cable from at least one controller and to wirelessly transmit the first information to the at least one surrounding vehicle or the infrastructure. The computer-program product includes instructions to wirelessly receive, via the remote active element, the second information from the at least one surrounding vehicle or the infrastructure external to the vehicle and to generate a signal strength indicator indicative of a signal strength of the wireless transmission of the first information to the at least one surrounding vehicle or the infrastructure external to the vehicle. The computer-program product includes instructions to wirelessly transmit the signal strength indicator to at least one controller to one of increase or decrease the signal strength of data to be transmitted from vehicle and to provide a measured temperature of a power amplifier that transmits the first information to the at least one surrounding vehicle or the infrastructure. The computer-program product includes instructions to wirelessly transmit the measured temperature of the power amplifier to the at least one controller to decrease the signal strength of data to be transmitted from the vehicle in the event the measured temperature of the power amplifier exceeds a predetermined temperature value.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 5 illustrates a method for monitoring a temperature of a power amplifier of a remote antenna active assembly in accordance to one embodiment; and FIG. 6 illustrates a method for transmitting a control signal to control a remote active antenna assembly in a transmit mode or a receive mode in accordance to one embodiment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

Aspects disclosed herein may provide a closed loop control of circuitry to compensate for coaxial cable losses between a connectivity controller and a remote mounted antenna. The aspects may also provide diagnostic feedback through the utilization of a two-way wireless communication protocol (e.g., Bluetooth communications link). In addition, circuitry that provides two-way wireless communication protocol in addition to sensing capabilities that may be used along with a coaxial cable that is used in current systems for information and for control signals.

Figure 1:
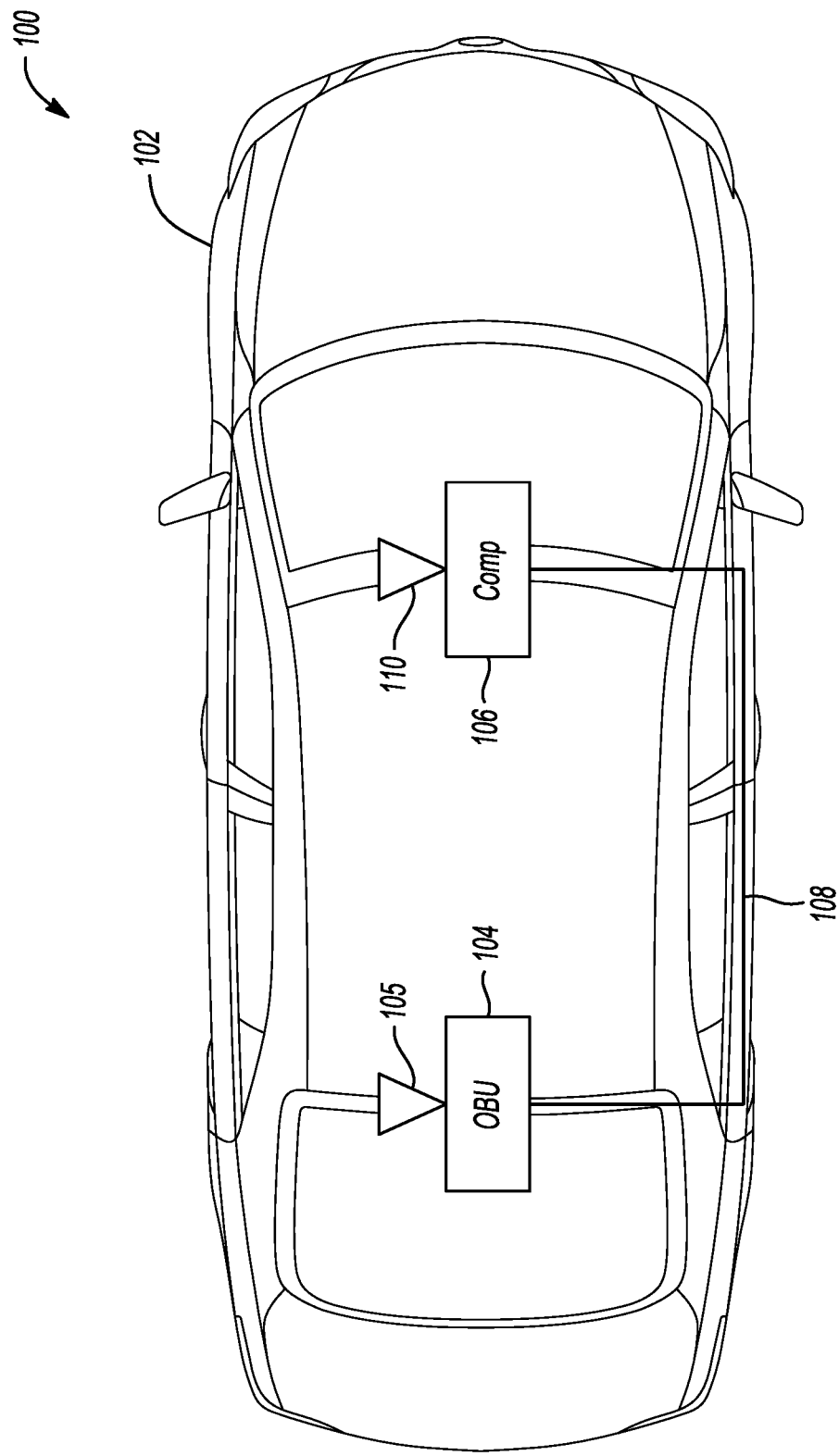
FIG. 1 illustrates a system for enabling wireless communication with a vehicle.

FIG. 1 illustrates a system 100 for enabling wireless communication with a vehicle 102. The system 100 is generally configured to support Vehicle-to-Everything (V2X) and Cellular Vehicle-to-Everything (C-V2X) communication. V2X generally involves the vehicle 102 being configured to transmit information to any entity that may affect the vehicle's ability to drive/operate. For example, under the V2X setting, the vehicle 102 may communicate, bi-directionally, with an infrastructure, grid, other vehicles, pedestrians, etc. C-V2X generally involves the vehicle 102 communicating over a wireless network such as for example a Long-Term Evolution (LTE) network or other suitable network to any one or more of the infrastructure, grid, other vehicles, pedestrians, etc.

The system 100 generally includes an on-board unit (OBU) (or controller) 104, a primary antenna 105, a compensator circuit 106, a coaxial cable, 108, and a diversity antenna 110. In general, the controller 104 may be operably coupled to the primary antenna 105 and may be mounted near a rear section of the vehicle 102 that is near a roof of the vehicle 102 (i.e., in a shark-fin based housing). The controller 104 may transmit and receive information to and from the infrastructure, network, pedestrians, other vehicles, etc. via the primary antenna 105. The primary antenna 105 may receive and/or transmit RF based data. The controller 104 generally includes baseband and transceiver elements for enabling V2X and C-V2X communications.

The diversity antenna 110 may be mounted remotely on another end of the vehicle 102 from the primary antenna 105 for a different perspective. The diversity antenna 110 may receive RF based data and/or transmit RF based data. The coaxial cable 108 electrically connects the controller 104 with compensator circuit 106, which then connects to the remote antenna 110. The coaxial cable 108 may introduce losses in the conducted RF signal path between the controller 104 and the compensator circuit 106. Such a loss may depend on the overall length of the cable 108. The compensator circuit 106 may be configured to compensate for such losses attributed to the coaxial cable 108. For example, the compensator circuit 106 may amplify the RF data as received from the remote antenna 110.

A switch (not shown) may be implemented in each of the controller 104 and the compensator circuit 106. The switch generally determines whether the controller 104 and the compensator circuit 106 are in a transmit mode or a receive mode. Alternatively, the switch in each of the controller 104 and the compensator circuit 106 enable the cable 108 to either transmit data from the vehicle 102 or receive data from surrounding vehicles or an infrastructure that is external to the vehicle 102. In general, the operations performed by the compensator circuit 106 may require synchronization with the controller 104 as the coaxial cable 108 is utilized for receiving and transmitting RF based information for V2X or C-V2X communications. Additionally, the compensator circuit 106 may sense the overall transmission power (or signal strength) of the remote antenna 110 which data is transmitted therefrom. The compensator circuit 106 may then transmit the measured power of the remote antenna 110 to the controller 104. The controller 104 determines whether the compensation circuit 106 (or itself) is adding appropriate power to the RF signal on the coaxial cable 108 to meet system and regulatory requirements.

Figure 2:
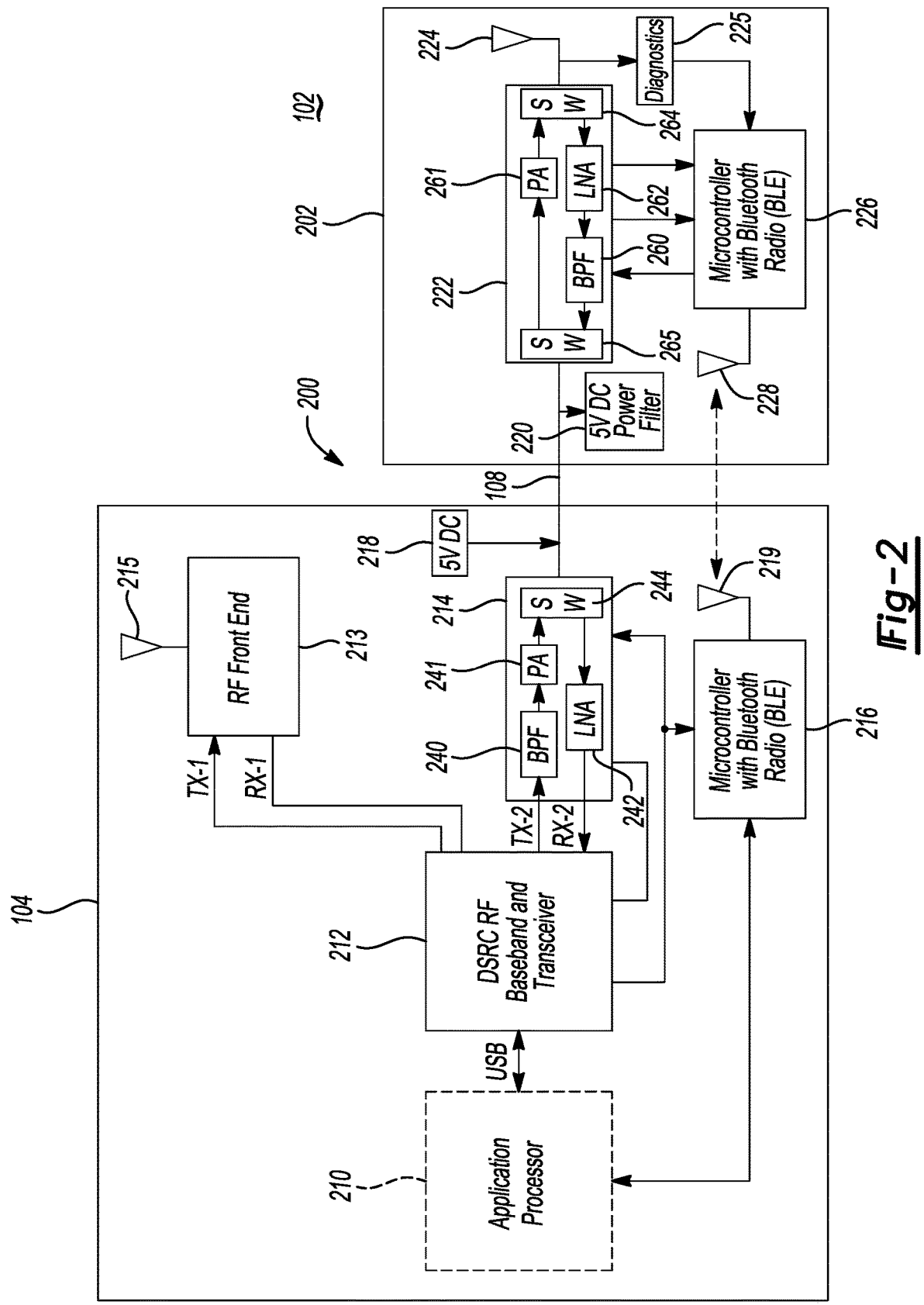
FIG. 2 illustrates a system for enabling wireless communication with a vehicle in accordance to one embodiment.

FIG. 2 depicts a system 200 for enabling wireless communication with a vehicle 102 in accordance to one embodiment. The system 200 includes the controller 104 and remote active antenna assembly 202. The coaxial cable 108 operably couples the controller 104 to the remote active antenna assembly 202. Similarly, as noted above in connection with the system 100, the system 200 enables the transmission and reception of information to support V2X and C-V2X communication.

The controller 104 includes at least one microprocessor 210 (hereafter "microprocessor 210"), a baseband/transceiver 212, a front-end circuit 213, a front-end circuit 214, a wireless protocol controller 216, and a power supply 218. The baseband/transceiver 212 may be implemented as a Dedicated Short-Range Communications (DSRC) RF baseband/transceiver. In one example, the wireless protocol controller 216 may be implemented as a controller that controls wireless protocol communication for a low energy Bluetooth wireless protocol. An antenna 219 is operably coupled to the wireless protocol controller 216 for wirelessly transmitting and receiving data to and from the remote active antenna assembly 202. The power supply 218 may provide power for the cable 108 to power circuitry on the remote active antenna assembly 202. The power supply 218 powers the cable 108.

The front-end circuit 213 generally forms two separate RF input and output paths for a primary radio inside an RF baseband and transceiver of the baseband/transceiver 212 to and from a primary antenna 215. Depending on Original Equipment Manufacturer (OEM) customer and system requirements, the antenna 215 may be positioned within the controller 104 as illustrated. Alternatively, the antenna 215 may be positioned outside of the controller 104. In one example, the antenna 215 may be coupled to the end of a short coaxial cable from the front-end circuit 213. With the embodiment illustrated in FIG. 2, there may be minimal cable losses for the RF signals.

The baseband/transceiver 212 may also have an independent, duplicate secondary or diversity radio, with separate transmission and reception signals for a remote antenna element 224 of the remote active antenna assembly 202. In general, the remote antenna element 224 may not serve as a redundant backup to the antenna 215. The remote antenna element 224 provides diversity or spatial differences in transmitting and receiving the RF signals. This diversity may improve the quality, reception, range, and reliability of the V2X wireless link. It is may also be effective in mitigating multipath situations, where the signal being transmitted from a distance is reflected off different surfaces (e.g., large buildings, bridges, mountains, bodies of water, etc.) and multiple copies or echoes arrive at the receiving antenna.

In general, the antenna 215 and the remote antenna element 224 may both be effective in transmitting and receiving the same information, with some sophisticated diversity processing being performed in the baseband controller 212 to ensure high performance while still within the overall RF power, and reception noise limits.

Referring back to the controller 104, the front-end circuit 213 may correspond to a RF front end circuit for transmitting RF data to surrounding vehicle and/or infrastructure. The front-end circuit 214 may also correspond to a RF front end circuit for transmitting and receiving RF data on the cable 108. The front-end circuit 214 includes a filter 240, a power amplifier 241, a low noise amplifier (LNA) 242, and a switch 244. In one example, the filter 240 may correspond to a bandpass filter. The wireless protocol controller 216 may control the switch 244 to place the controller 104 in either a transmit mode or a receive mode.

As noted above, the remote active antenna assembly 202 functions in part as a remote antenna and transmits/receives RF based data. In one example, such data may correspond to, but not limited to, safety messages from surrounding vehicles and/or infrastructure, longitude, latitude, elevation, speed, heading, horizontal acceleration (longitudinal and lateral), yaw rate, and path history from surrounding vehicles. The remote active antenna assembly 202 transmits such information to the controller 104 via the cable 108 in response to receiving the information from the surrounding vehicles or infrastructure. While in this mode, the baseband/transceiver 212 controls the switch 244 such that the controller 104 receives the data from the remote active antenna assembly 202 via the cable 108 and the wireless protocol controller 216 wirelessly transmits the control signal to the remote active assembly 202 to transmit the received information to the controller 104. The amplifier 242 amplifies the RF energy as received from the remote active antenna assembly 202 via the cable 108.

The front-end circuit 214 may then transmit the filtered safety information to the baseband/transceiver 212. The baseband/transceiver 212 converts the raw-filtered RF data into digital data for transmission on a communication bus to the microprocessor 210. The communication bus may correspond to a Universal Serial Bus (USB), Secure Digital Input Output (SDIO), Serial Peripheral Interface (SPI) or other similar communication bus. The microprocessor 210 may then transmit the data received from the baseband/transceiver 212 over a vehicle communication bus to other vehicle controllers (not shown) in the vehicle 102.

The remote active antenna assembly 202 includes a power filter 220, a front-end circuit 222, the remote antenna element 224, a diagnostics controller 225, and a wireless protocol controller 226. The front-end circuit 222 may be implemented as a RF front end circuit for receiving information from the surrounding vehicles or infrastructure in connection with V2X or C-V2X applications when the remote active antenna assembly 202 is switched into a receive mode. Similarly, the front-end circuit 22 may transmit safety related information from the vehicle 104 to the surrounding vehicle and/or to an infrastructure surrounding the vehicle 104 when the remote active antenna assembly 202 is switched into a transmit mode.

The wireless protocol controller 226 wirelessly transmits information to the controller 104 (e.g., the wireless protocol controller 216) via the antenna 228. The information may correspond to diagnostics (e.g., diagnostics for the remote antenna element 224), a temperature of various electronics positioned on the front-end circuit 222 (e.g., a temperature of power amplifier 261), and a signal strength indicator of transmitted RF signals from the remote active antenna assembly 202 to the surrounding vehicle and the infrastructure. In one example, such information may be wirelessly transmitted via BLE or other suitable wireless communication protocol. The front-end circuit 222 includes a filter 260, the power amplifier 261, an LNA 262, a switch 264, and a switch 265. Similar to the filter 240 noted above in the front-end circuit 214 of the controller 104, the filter 260 of the remote active antenna assembly 202 may be implemented as, for example, a band pass filter. While the remote active antenna assembly 202 is in the transmit mode (e.g., the vehicle 102 transmits information to surrounding vehicles or to the infrastructure surrounding the vehicle 102) or in the receive mode (e.g., the vehicle 102 receives information from surrounding vehicles or from the infrastructure), the filter 260 improves frequency selectivity (e.g., allows intended band and rejects unintended band) to improve the overall signal to noise ratio (SNR). In general, while the utilization of the filter 260 (and the filter 240 in the controller 104) are used to enhance RF transmission/reception performance, the use of such filters 240, 260 may be optional. The power amplifier 261 boosts the transmission of RF data from the cable 108. As noted above, the overall transmission strength of the RF signal as transmitted over the cable 108 may diminish due to the overall length of the cable 108. The LNA 262 amplifies/increases the RF signal as received from surrounding vehicles or the infrastructure when the signal is received. For example, the LNA 262 provides low noise amplification for received RF signals from surrounding vehicles or the infrastructure received at the remote active antenna assembly 202. The diagnostic controller 225 is configured to provide diagnostics on the remote antenna element 224. For example, the diagnostic controller 225 determines whether the whether the remote antenna element 224 is connected/disconnected. Additionally, or alternatively, the remote antenna element 224 may be damaged and exhibit a short condition or an issue may exist with a contact to a printed circuit board (PCB) positioned on the remote active antenna assembly 202. The diagnostic controller 225 provides information corresponding to the status of the remote antenna element 224 to the wireless protocol controller 226. The wireless protocol controller 226 wirelessly transmits the status of the remote antenna element 224 to the wireless protocol controller 216 of the controller 104. The wireless protocol controller 216 then transmits the status of the remote antenna element 224 to the microprocessor 210. The microprocessor 210 may transmit the status of the remote antenna element 224 to other vehicle controller(s) (not shown) in the vehicle 102. Either that the microprocessor 210 or the vehicle controller(s) may generate an alert to notify a user of the status of remote antenna element 224.

The front-end circuit 222 also provides diagnostic information corresponding to Transmit Signal Strength Indicator (TSSI) to the wireless protocol controller 226, which in turn, wirelessly transmits such data to the wireless protocol controller 216 on the controller 104. The TSSI generally corresponds to the actual signal strength of the signals transmitted from the remote active antenna assembly 202 to the surrounding vehicle(s) and/or the infrastructure. Additionally, the front-end circuit 222 also transmits information corresponding to the temperature of the power amplifier 261 (e.g., PA Temp) to the wireless protocol controller 226. In turn, the wireless protocol controller 226 wirelessly transmits information corresponding to the TSSI and the PA Temp to the wireless protocol controller 226 of the controller 104 for feedback.

In connection with the TSSI, the wireless protocol controller 216 of the controller 104 transmits such data via another communication protocol to the microprocessor 210. In one example, the wireless protocol controller 216 may communicate with the microprocessor 210 via a Universal Asynchronous Receiver-Transmitter (UART). In general, the microprocessor 210 or another suitable vehicle controller in the vehicle 102 may compare the measured TSSI to a predetermined TSSI threshold. The predetermined TSSI threshold corresponds to a value that includes a tolerance of, for example, +/−2 dB. If the measured TSSI is greater than the predetermined TSSI threshold, then the controller 104 may reduce the overall signal strength of the RF signal as transmitted therefrom over the cable 108 and to the remote active antenna assembly 202. In this case, the RF front end circuit 214 via the power amplifier 241 may reduce the amount of power that is provided to the incoming RF signal from the baseband/transceiver 212. If the measured TSSI is less than the predetermined TSSI threshold, then the controller 104 may increase the signal strength of the RF signal as transmitted over the cable 108 and to the remote active antenna assembly 202. In this case, the RF front end circuit 214 via the power amplifier 241 may increase the amount of power that is provided to the incoming RF signal from the baseband/transceiver 212.

With respect to the temperature of the power amplifier 261 (hereafter "PA Temp"), the wireless protocol controller 216 of the remote active antenna assembly 202 transmits such data via the wireless communication protocol to wireless protocol controller 216. The wireless protocol controller 216 then transmits the PA Temp to the microprocessor 210 or another suitable vehicle controller. The microprocessor 210 or the suitable vehicle controller may compare the measured PA Temp to a predetermined temperature threshold. If the measured PA Temp exceeds the predetermined temperature threshold, then the controller 104 may reduce the overall signal strength of the RF signal as transmitted therefrom over the cable 108 and to the remote active antenna assembly 202. Generally, any temperature increase may cause derating (decrease) of a maximum output power specification of the power amplifier 261. If the measured PA Temp is below the predetermined temperature threshold, then the controller 104 can maintain the current signal strength level or increase the signal strength of the RF data as transmitted therefrom over the cable 108 and to the remote active antenna assembly 202.

The baseband controller 212 transmits a first control signal to the switch 244 to place the controller 104 in the transmit mode (e.g., the controller 104 transmits RF signals to the remote active antenna assembly 202 over the cable 108). The wireless protocol controller 216, at the same time, wirelessly transmits the first control signal to the remote active antenna assembly 202 to control both switches 264, 265 to place the remote active antenna assembly 202 into a receive mode (e.g., the remote active antenna assembly 202 receives RF signals from the controller 104.

The baseband controller 212 transmits a second control signal to the switch 244 to place the controller 104 in the receive mode (e.g., the controller 104 receives RF signals from the remote active antenna assembly 202 over the cable 108). The wireless protocol controller 216, at the same time, wirelessly transmits the second control signal to the remote active antenna assembly 202 to control both switches 264, 265 to place the remote active antenna assembly 202 into the transmit mode (e.g., the remote active antenna assembly 202 transmits RF signals as received from the surrounding vehicles or the infrastructure to the controller 104). While the controller 104 is in the receive mode, the LNA 242 provide low noise amplification for received RF signals from the remote active antenna assembly 202.

Figure 3:
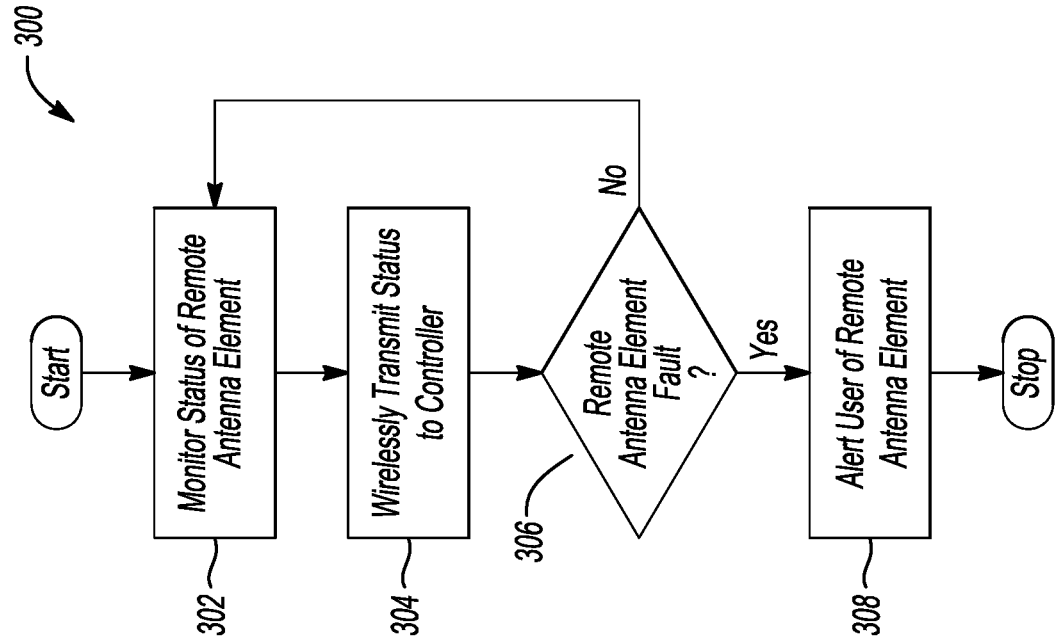
FIG. 3 illustrates a method for monitoring status of a remote antenna element in accordance to one embodiment.

FIG. 3 illustrates a method 300 for monitoring status of the remote active antenna 224 in accordance to one embodiment.

In operation 302, the remote active antenna assembly 202 performs diagnostics on the remote antenna element 224 to determine if the remote antenna element 224 is connected, disconnected, or short-circuited to the remote antenna active assembly 202.

In operation 304, the remote active antenna assembly 202 wirelessly transmits status of the remote antenna element 224 to the controller 104.

In operation 306, the controller 104 determines whether the remote antenna element 224 has exhibited a fault (e.g., the remote active antenna 224 is disconnected from the remote active antenna assembly 202, or short circuited). If the remote antenna element 224 is exhibiting a fault, the method 300 moves to operation 308. If not, then the method 300 moves back to operation 302.

In operation 308, the controller 104 (or another vehicle controller) generates a fault code to alert a user of the fault to the remote antenna element 224.

Figure 4:
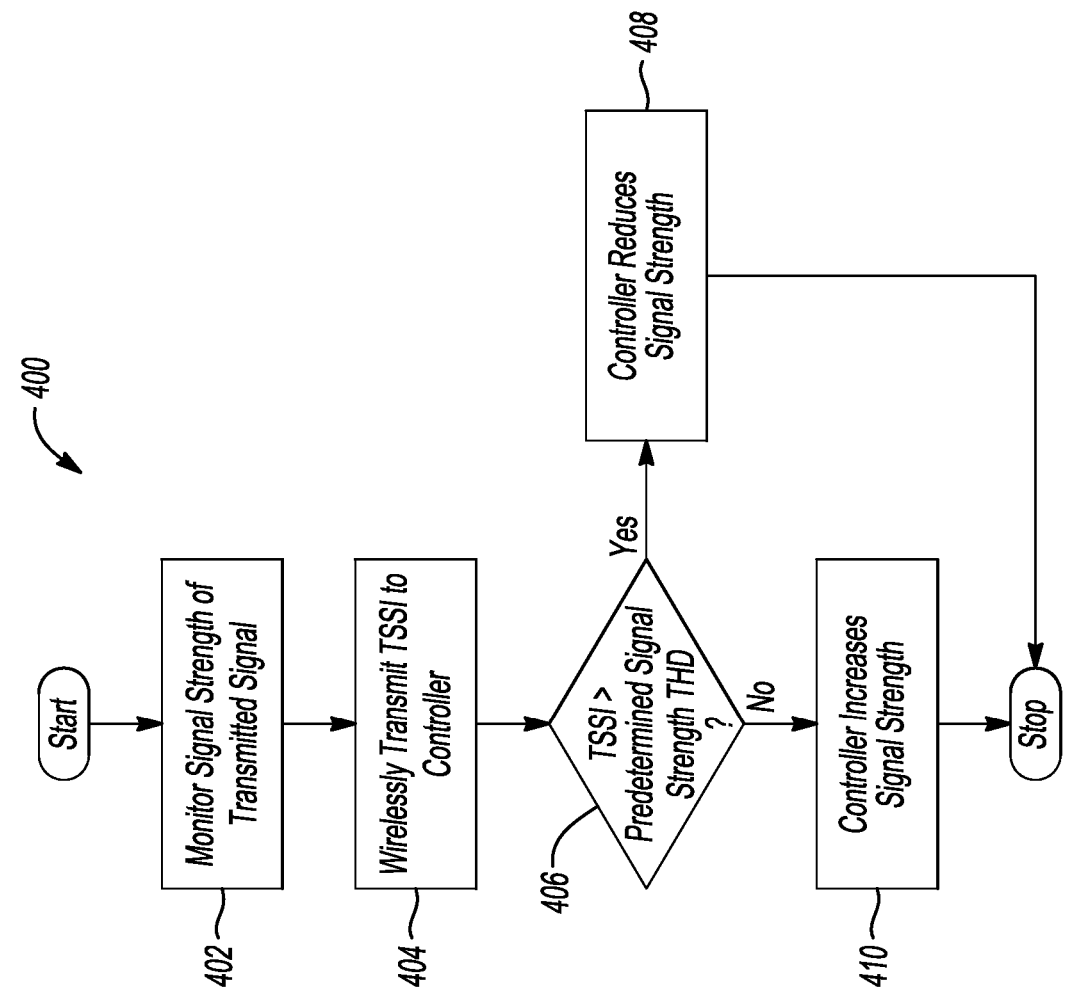
FIG. 4 illustrates a method for monitoring status of signal strength of a transmitted signal from a remote antenna active assembly in accordance to one embodiment.

FIG. 4 illustrates a method 400 for monitoring a signal strength of a transmitted signal from the vehicle 102 in accordance to one embodiment.

In operation 402, the remote active antenna assembly 202 monitors the signal strength of the transmitted RF data as transmitted to the surrounding vehicle and/or the infrastructure. In this case, the front-end circuit 222 generates and transmits the TSSI to the wireless protocol controller 226.

In operation 404, the remote active antenna assembly 202 wirelessly transmits the TSSI to the controller 104.

In operation 406, the controller 104 compares the TSSI to the predetermined signal strength threshold. If the TSSI is greater than the predetermined signal strength threshold, then the method moves to operation 408. If this condition is false, then the method 400 moves to operation 410.

In operation 408, the controller 104 reduces the signal strength for the RF signal as transmitted therefrom to the remote active antenna assembly 202 which is subsequently transmitted to the surrounding vehicle or to the infrastructure external to the vehicle 104.

In operation 410, the controller 104 increases the signal strength for the RF signal as transmitted therefrom to the remote active antenna assembly 202 which is subsequently transmitted to the surrounding vehicle or to the infrastructure external to the vehicle 104.

FIG. 5 illustrates a method 500 for a temperature of the power amplifier 261 of the remote active antenna assembly 202 in accordance to one embodiment.

In operation 502, the remote active antenna assembly 202 monitors the temperature of the power amplifier 261. In this case, the front-end circuit 222 generates and transmits PA Temp to the wireless protocol controller 226.

In operation 504, the remote active antenna assembly 202 wirelessly transmits the PA Temp to the controller 104.

In operation 506, the controller 104 compares the PA Temp to the predetermined temperature value. If the PA Temp is less than the predetermined temperature value, then the method moves to operation 508. If this condition is false, then the method 500 moves to operation 510.

In operation 508, the controller 104 maintains the signal strength of the RF data (i.e., there is no change to the signal strength for the RF data) as transmitted therefrom to the remote active antenna assembly 202 which is subsequently transmitted to the surrounding vehicle or to the infrastructure external to the vehicle 104.

In operation 510, the controller 104 decreases the signal strength for the RF data as transmitted therefrom to the remote active antenna assembly 202 and which is subsequently transmitted to the surrounding vehicle or to the infrastructure external to the vehicle 104.

FIG. 6 illustrates a method 600 for wirelessly transmitting a control signal to control a remote active antenna assembly 202 in a transmit mode or a receive mode in accordance to one embodiment.

In operation 602, the controller 104 wirelessly transmits a control signal to the remote active antenna assembly 202 to control the remote active antenna assembly 202 to be in a transmit mode or in a receive mode.

In operation 604, the remote active antenna assembly 202 determines whether the control signal corresponds to a command to enter into the transmit mode or into the receive mode. If the control signal corresponds to the transmit mode, then the method 600 moves to operation 606. If the control signal corresponds to the receive mode, then the method 600 moves to operation 608.

In operation 606, the remote active antenna assembly 202 transmits the RF signals as received from the controller 104 to the surrounding vehicles or infrastructure in the transmit mode. For example, the wireless protocol controller 226 transmits a signal to the switches 264, 265 to enable RF signals to pass through the front-end circuit 222 and to the antenna 224. The antenna 224 transmits the RF signals to the surrounding vehicles or infrastructure.

In operation 608, the remote active antenna assembly 202 receives the RF signals as received from surrounding vehicles or infrastructure in the receive mode. For example, the wireless protocol controller 226 transmits a signal to the switches 264, 265 to enable RF signals to pass through the front-end circuit 222 and to the cable 108. The cable 108 transmits the RF signals to the controller 104. In the receive mode, the remote active antenna assembly 202 transmits the received RF signals from the surrounding vehicles or infrastructure to the controller 104 over the cable 108 for processing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for enabling wireless communication for a vehicle, the system comprising:
   at least one controller configured to:
   generate first information for the vehicle for transmission to at least one surrounding vehicle or an infrastructure external to the vehicle; and
   receive second information from the at least one surrounding vehicle and the infrastructure external to the vehicle;
   a remote active antenna assembly configured to:
   receive the first information over a cable;
   wirelessly receive over a wireless communication protocol a control signal directly from the controller, the control signal being indicative of the remote active antenna assembly being in one of a transmit mode or a receive mode;
   wirelessly transmit, via a remote active element, the first information to the at least one surrounding vehicle or the infrastructure external to the vehicle in response to the control signal indicating that the remote active assembly is in the transmit mode; and
   wirelessly receive, via the remote active element, the second information from the at least one surrounding vehicle or the infrastructure external to the vehicle in response to the control signal indicating that the remote active assembly is in the receive mode.

2. The system of claim 1, wherein the remote active antenna assembly is further configured to transmit the second information over the cable to the at least one controller while in the receive mode.

3. The system of claim 1, wherein the remote active antenna assembly is further configured to:
   perform diagnostics on the remote active element; and
   wirelessly transmit third information corresponding to the diagnostics of the remote active element to the at least one controller to provide status of the diagnostics of the remote active element.

4. The system of claim 3, wherein the third information corresponds to whether the remote active element is exhibiting a short-circuit condition or is disconnected from the remote active antenna assembly.

5. The system of claim 4, wherein the at least one controller is configured to alert a user in the event the third information indicates that the remote active element has been disconnected from the remote active antenna assembly or is exhibiting the short-circuit condition.

6. The system of claim 1, wherein the remote active antenna assembly is further configured to generate a signal strength indicator indicative of a signal strength of a wireless transmission of the first information to the at least one surrounding vehicle or the infrastructure external to the vehicle.

7. The system of claim 6, wherein the remote active antenna assembly is further configured to wirelessly transmit the signal strength indicator to the at least one controller.

8. The system of claim 7, wherein the at least one controller is further configured to compare the signal strength indicator to a predetermined signal strength value and to increase or decrease the signal strength of data to be transmitted from the vehicle based on the comparison of the signal strength indicator to the predetermined signal strength value.

9. The system of claim 1, wherein the remote active antenna assembly includes a power amplifier configured to amplify the first information for transmission to the at least one surrounding vehicle or the infrastructure external to the vehicle in the transmit mode.

10. The system of claim 9, wherein the remote active antenna assembly is further configured to provide a measured temperature of the power amplifier and to wirelessly transmit the measured temperature of the power amplifier over the wireless communication protocol to the at least one controller.

11. The system of claim 10, wherein the at least one controller is further configured to compare the measured temperature of the power amplifier to a predetermined temperature value and to decrease a signal strength of data to be transmitted from the vehicle in the event the measured temperature of the power amplifier exceeds the predetermined temperature value.

12. The system of claim 1, wherein the wireless communication protocol is a Bluetooth Low Energy protocol.

13. An apparatus for enabling wireless communication for a vehicle, the apparatus comprising:
    a wireless protocol controller, and
    a remote active antenna assembly including the wireless protocol controller and being configured to:
        receive first information for the vehicle for transmission to at least one surrounding vehicle or an infrastructure external to the vehicle over a cable from at least one controller;
        wirelessly transmit, via a remote antenna element, the first information to the at least one surrounding vehicle or the infrastructure;
        wirelessly receive, via the remote antenna element, second information from the at least one surrounding vehicle or the infrastructure external to the vehicle;
        transmit the second information to the at least one controller over the cable;
        perform diagnostics on the remote antenna element; and
        wirelessly transmit third information corresponding to the diagnostics of the remote antenna element to the at least one controller to provide operational status of the remote antenna element,
    wherein the remote active antenna assembly includes a power amplifier configured to amplify the first information for transmission to the at least one surrounding vehicle or the infrastructure external to the vehicle, and
    wherein the remote active antenna assembly is further configured to provide a measured temperature of the power amplifier and to wirelessly transmit the measured temperature of the power amplifier to the at least one controller to compare the measured temperature of the power amplifier to a predetermined temperature value and to decrease a signal strength of data to be transmitted from the vehicle in the event the measured temperature of the power amplifier exceeds the predetermined temperature value.

14. The apparatus of claim 13, wherein the third information corresponds to whether the remote active element is exhibiting a short-circuit condition or is disconnected from the remote active antenna assembly.

15. The apparatus of claim 13, wherein the remote active antenna assembly is further configured to generate a signal strength indicator indicative of a signal strength of a wireless transmission of the first information to the at least one surrounding vehicle or the infrastructure external to the vehicle.

16. The apparatus of claim 15, wherein the remote active antenna assembly is further configured to wirelessly transmit the signal strength indicator to the at least one controller to compare the signal strength indicator to a predetermined signal strength value and to increase or decrease the signal strength of data to be transmitted from the vehicle based on the comparison of the signal strength indicator to the predetermined signal strength value.

17. The apparatus of claim 13, wherein the at least one controller is further configured to wirelessly transmit the third information corresponding to the diagnostics of the remote antenna element over a Bluetooth Low Energy protocol.

18. A computer-program product embodied in a non-transitory computer readable medium that is programmed to enable wireless communication for a vehicle, the computer-program product comprising instructions to:
    receive first information for the vehicle for transmission to at least one surrounding vehicle or an infrastructure external to the vehicle over a cable from at least one controller;
    wirelessly transmit the first information to the at least one surrounding vehicle or the infrastructure;
    wirelessly receive, via a remote active antenna, second information from the at least one surrounding vehicle or the infrastructure external to the vehicle;
    generate a signal strength indicator indicative of a signal strength of a wireless transmission of the first information to the at least one surrounding vehicle or the infrastructure external to the vehicle;
    wirelessly transmit the signal strength indicator to at least one controller to one of increase or decrease the signal strength of data to be transmitted from vehicle;
    provide a measured temperature of a power amplifier that transmit the first information to the at least one surrounding vehicle or the infrastructure; and
    wirelessly transmit the measured temperature of the power amplifier to the at least one controller to decrease the signal strength of data to be transmitted from the vehicle in the event the measured temperature of the power amplifier exceeds a predetermined temperature value.

* * * * *